Aug. 29, 1950

A. S. PAGE 2,520,777

MEANS FOR UTILIZING BRAKE TORQUE
IN A VEHICLE SUSPENSION

Filed April 22, 1948

INVENTOR.
ANCEL S PAGE
BY
F. R. Geisler.
ATTORNEY

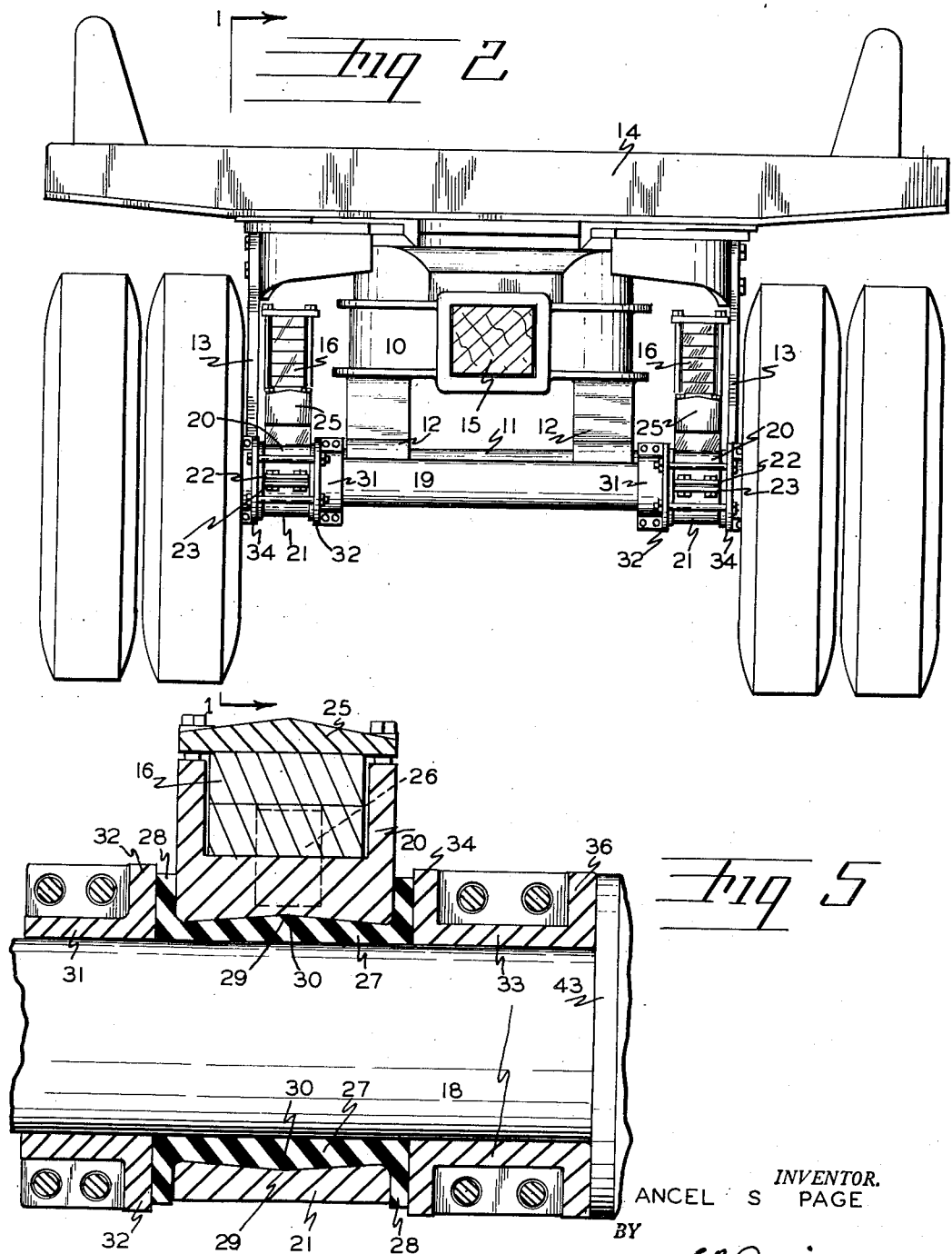

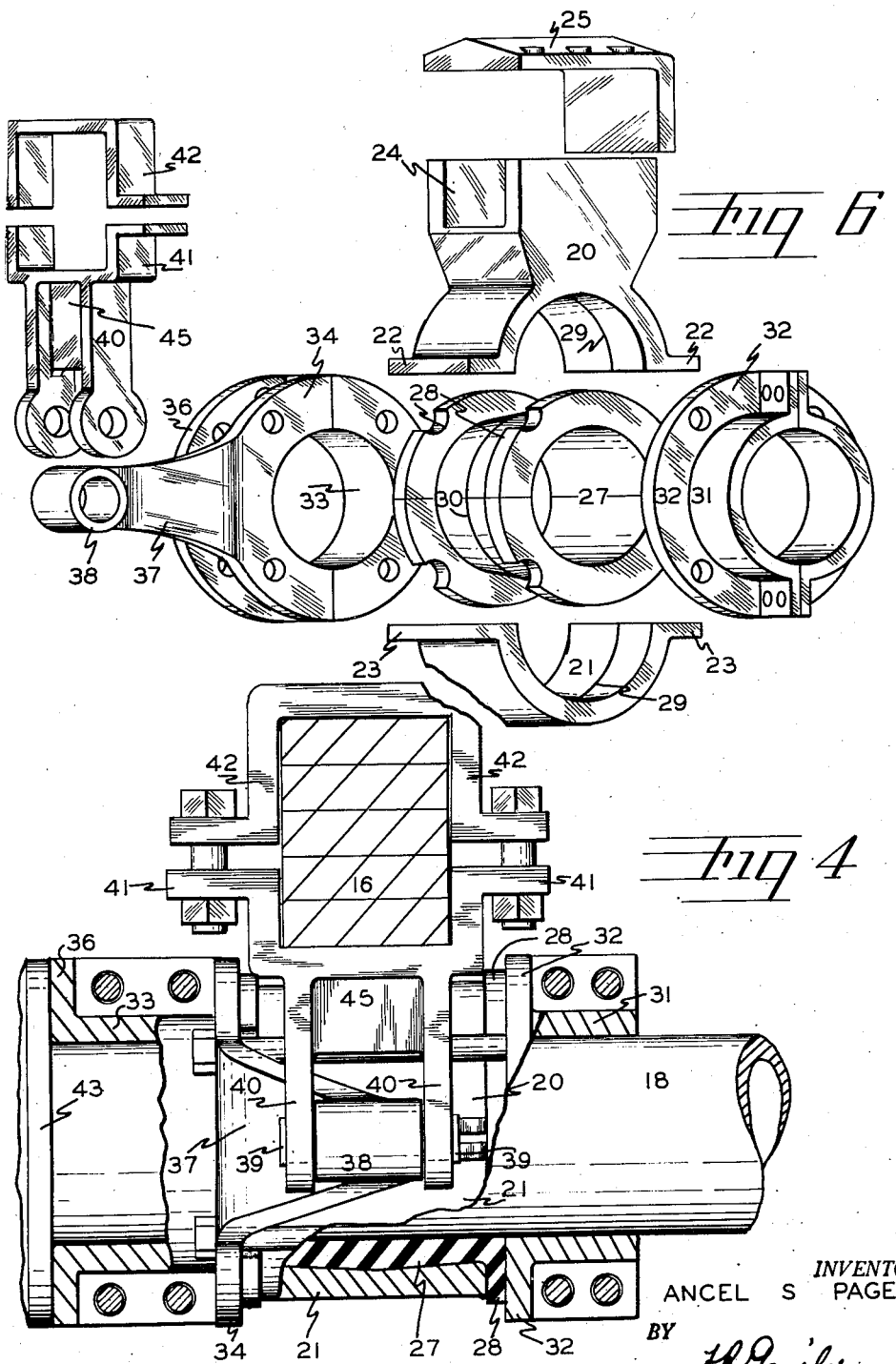

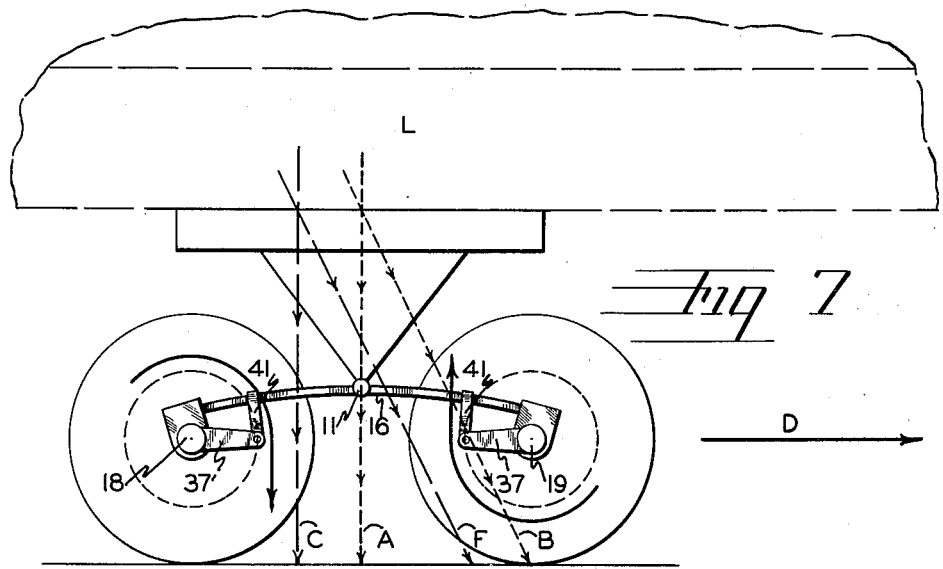
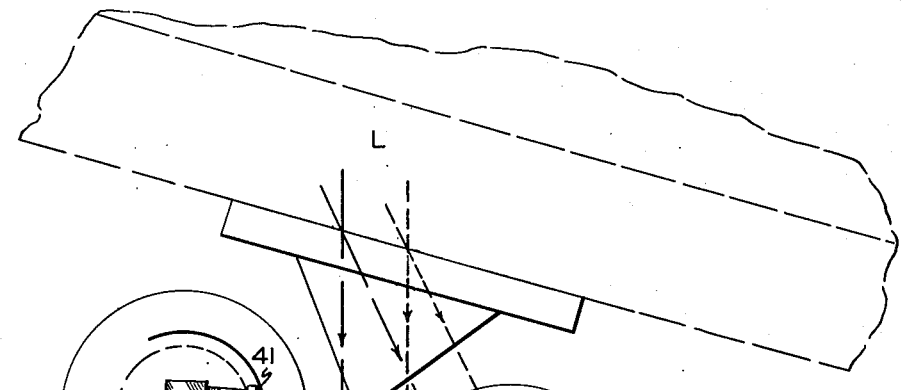
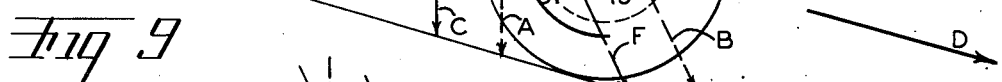
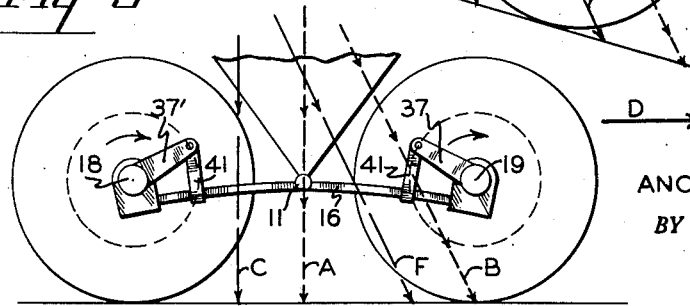
INVENTOR.
ANCEL S PAGE

Patented Aug. 29, 1950

2,520,777

UNITED STATES PATENT OFFICE 2,520,777

MEANS FOR UTILIZING BRAKE TORQUE IN A VEHICLE SUSPENSION

Ancel S. Page, Portland, Oreg.

Application April 22, 1948, Serial No. 22,661

6 Claims. (Cl. 280—104.5)

This invention relates to the type of dual axle vehicle suspension in which a pair of axles are located at the respective ends of a pair of pivotally-mounted, longitudinally-extending walking beams or walking beam assemblies mounted at each side of the vehicle for up and down pivotal movement with respect to the main frame of the vehicle. Each walking beam may consist of a solid or rigid pivotally-mounted beam, or, as is more customary, may comprise a leaf spring, or a pair of leaf springs, formed into a longitudinally-extending, pivotally mounted leaf spring assembly.

When the wheel axles are located at the respective ends of such pivotally mounted walking beams a difficulty arises with the application of the brakes to the wheels, for example, if the vehicle is traveling rapidly on a highway and, in particular, if the vehicle is traveling down an appreciable grade. The problem presented, which has long been recognized and for which, to the best of my knowledge, no adequate solution has previously been found, is caused by the fact that a greater force, or load or braking torque, is imposed on the front axle wheels than on the rear axle wheels. Manifestation of this condition can readily be observed. Thus when equal braking force is applied to front and rear wheels, the rear wheels can often be seen to lock and drag along the road surface while the front wheels continue to revolve, thus indicating the heavier load on the front wheels.

To prevent this undesirable skidding of the rear wheels, with consequent excessive wear of the rear tires, it has become more or less customary to adjust the brakes so that less braking force will be applied to the rear wheels than to the front wheels. However, no definite adjustment of the brakes solves the difficulty inasmuch as such variable factors as amount of load, vehicle momentum, and road grade, are involved in each case.

A further manifestation of the problem involved may be observed from the fact that the front ends of the walking beams, when the brakes are applied to the wheels, will exhibit a tendency to bear down further while the rear ends will correspondingly show a tendency to be lifted slightly, thus also giving evidence of increased load or force encountered by the front wheels with the opposite condition being encountered by the rear wheels.

The problem above outlined has been recognized as a particularly serious one in the use of the familiar types of dual axle logging trucks and trailers, for these vehicles haul heavy loads not only along highways but down relatively steep mountain roads and slopes where prolonged application of the brakes is necessary.

During my experience with the operation of logging vehicles under such circumstances over a number of years, I have tried in various ways to cope with and to relieve this unequal load or force imposed at different ends of the walking beam assembly. Finally it occurred to me that the braking torque developed under such conditions and which was imposed upon, and was required to be absorbed by, the front wheels, axle housings and corresponding ends of the walking beams, could, if properly utilized, aid in relieving the additional load thrust on the forward wheels. Experiments which I then performed in developing this idea resulted in the present invention.

The principal object of the present invention accordingly is to provide an improved vehicle suspension in which walking beams, or their equivalent, are included, and in which the added load thrust on the forward wheels and axles resulting from the application of the brakes, can be in part transferred to the rear wheels.

Another object of my invention is to provide a dual-axle-walking-beam construction in which excessive brake torque can be transmitted to the walking beams in a novel manner and thence transmitted through the walking beams for a definite purpose.

A further and more specific object of my invention is to provide an improved construction involving vehicle axles and walking beams in which the brake torque, which has heretofore been required to be absorbed by the axle mountings and ends of the walking beams, can be advantageously utilized in counter-balancing the unequal distribution of weight on the front and rear axles.

An additional related object of this invention is to provide a semi-flexible mounting for the axles in the walking beams, in place of the customary rigid axle mounting, which will permit some slight degree of turning of the axles with respect to the ends of the walking beams to which they are attached, as a means of enabling the brake torque on the axles to be utilized instead of being merely dissipated.

A still further object of the present invention is to provide an improved vehicle suspension capable of carrying out the above objects, which will be simple and practical and capable of installation on any vehicle in which walking beams or their equivalent are used.

These objects and other advantages I have been able to attain by dispensing with the customary welded or rigid axle mountings or housings at the ends of the walking beams and by providing special mountings to which brake torque arms have been added and which act to transmit braking torque from the axles to the walking beams in a definite manner, and finally by utilizing the braking torque and resulting forces advantageously as hereinafter briefly described with reference to the accompanying drawings.

In the drawings:

Fig. 2 is an end elevation of the same vehicle, the view being taken from the right of Fig. 1;

Fig. 4 is a fragmentary vertical section on line 4—4 of Fig. 1, drawn to a larger scale, with portions of the axle-mounting sleeves broken away;

Fig. 5 is a fragmentary vertical section on line 5—5 of Fig. 1, but drawn to a larger scale;

Fig. 6 is an exploded view, in perspective, of the various members constituting the axle mounting at the end of one of the walking beams, including also the special torque arm connection, with the axle and walking beam entirely omitted from the drawing, the members being shown arranged in their related order;

Fig. 7 is a diagrammatic representation of the operation of my invention when employed in a dual axle logging trailer traveling in a horizontal line;

Fig. 8 is a similar diagrammatic representation of the operation of my invention in such a vehicle when traveling down a grade; and Fig. 9 is a diagrammatic representation of a slightly modified form of construction involving my invention.

Figure 1:
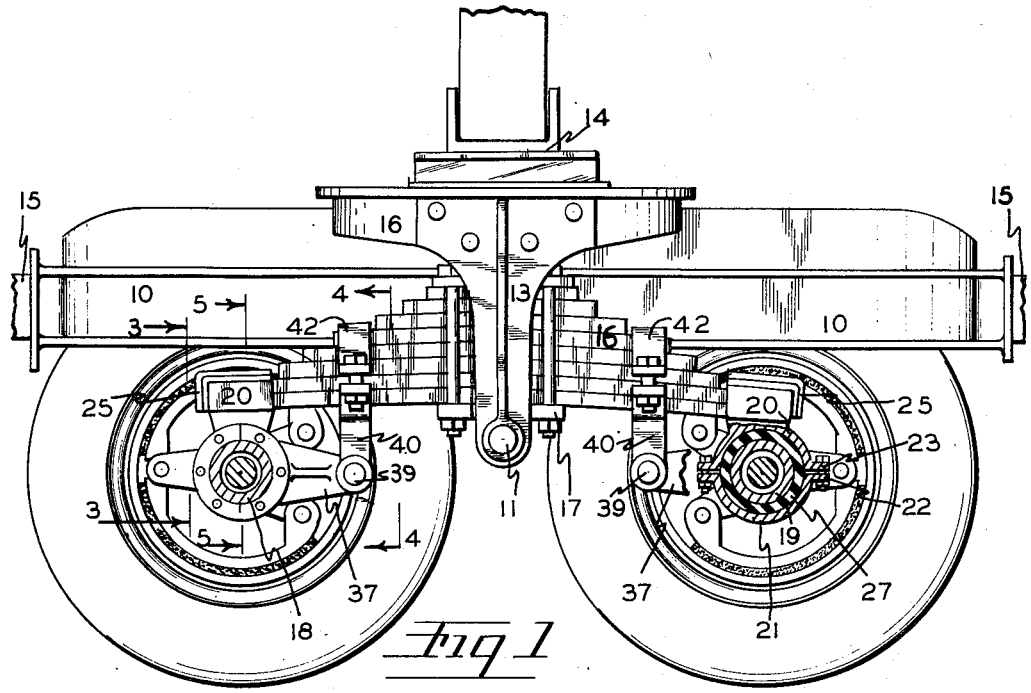
Fig. 1 is a side elevation of a dual axle logging trailer embodying one form of my invention, the near side wheels having been omitted from the drawing for the sake of clarity and a portion of one of the mountings for the axles being shown in section.

Referring first to Figs. 1 and 2, the dual axle logging trailer in which I have illustrated my invention as being employed, includes a main frame 10, pivotally supported on a central transverse trunnion shaft 11, by means of inner supports 12 and outside brackets 13. A swivelly mounted bunk 14 is supported on top of the frame and in turn supports the log load in the usual manner. The trailer is adapted to be connected to a leading truck (not shown) by means of the usual reach 15.

A pair of spring walking beams 16 are clamped at their centers on saddles 17 which are rockably mounted on the trunnion shaft 11 at each side of the vehicle in the usual manner. The two axles 18 and 19 are mounted at the respective ends of the walking beams but instead of being rigidly mounted in any of the customary ways, are mounted by a special mounting hereinafter to be explained.

Figure 3:
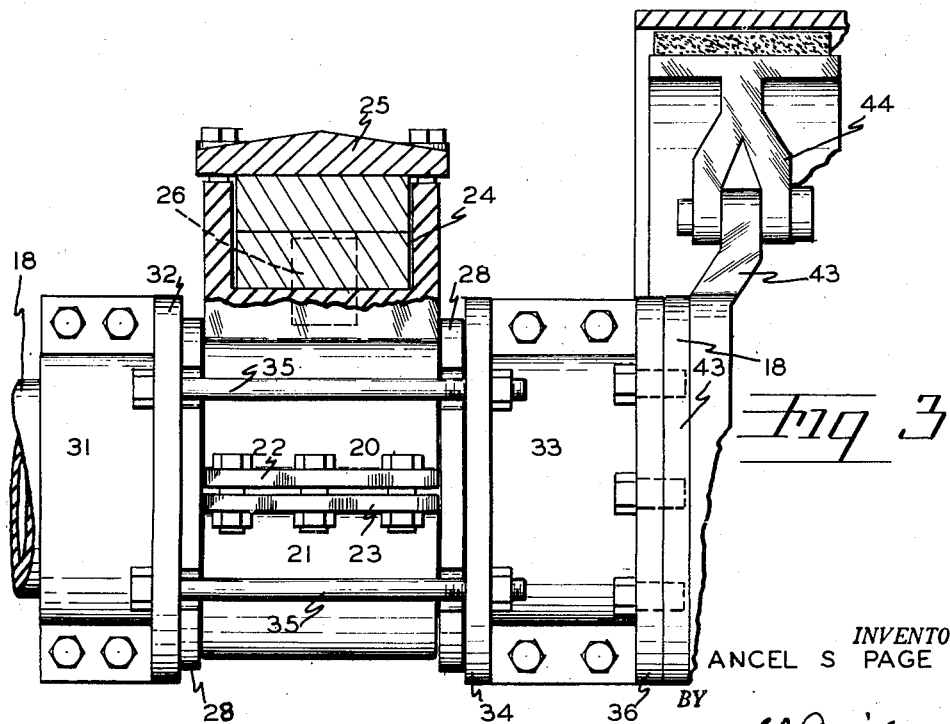
Fig. 3 is a fragmentary vertical section corresponding to line 3—3 of Fig. 1, but drawn to a much larger scale, and including also a portion of the brake drum for the adjacent wheel.

An axle housing, comprising an upper section 20 and a lower section 21 (shown more clearly in Fig. 6), the two sections being secured together by bolts extending through the pairs of abutting flanges 22 and 23, is carried at each end of the spring walking beams 16. The upper section 20 of each of these housings is formed with a channel 24 to accommodate the reduced end of the spring walking beam, and a cap 25 is bolted down to the upper section 20 over the end of the spring walking beam. A vertical pin, indicated by the broken lines 26 in Fig. 5, and extending through a hole near the end of the spring walking beam, holds the housing section 20 against longitudinal movement with respect to the spring. A rubber bushing, in the form of a sleeve 27 having an annular flange 28 at each end, made in two semi-cylindrical or half sections, is placed about the axle 18 or 19 within the housing sections 20 and 21. The two flanges 28 of the rubber bushing extend over the sides of the housing sections 20 and 21 when the housing is secured about the axle, as shown in Figs. 3 and 5. The interior bearing faces of the housing sections 20 and 21 may be made cylindrical but I prefer to have them in the form of a shallow annular trough, as illustrated at 29 in Fig. 5, and correspondingly form the outer bearing surface of the rubber bushing 27 with a flattened annular ridge 30. Thus I make the rubber bushing thickest around its center with the result that a slight tipping of the axle in either direction (for example a tipping of the axle 18 in Fig. 5) will cause the top of the axle to be brought more nearly into parallelism with one portion of the housing bearing surface while the bottom of the axle is brought more nearly into parallelism with the opposite portion of the housing bearing surface.

A flanged sleeve 31 (Figs. 2, 3, 5 and 6) formed in two half sections which are bolted together, as shown in Figs. 2 and 6, which sleeve has an annular flange 32, is placed around the axle adjacent the housing 20, 21 on the inner side. A second flanged sleeve 33 (Figs. 3, 5, and 6), also formed in two half sections which are bolted together, and having an inner flange 34 and an outer flange 36, is placed around the axle adjacent the housing 20, 21 on the outer side. Clamping bolts 35 (Fig. 3) extend through the flanges 32 and 34 of these sleeves and thus cause these sleeves to hold the housing 20, 21 and the flanges 28 of the rubber bushing 27 clamped tightly between the sleeves as shown in Fig. 3.

An inwardly curved arm 37, which I designate as a brake torque arm (Fig. 4 and 6), is formed integral with one section of the flange 34 of the sleeve 33. This torque arm 37 terminates in a horizontal bearing 38. A rubber bushing (not shown) is placed in this bearing 38 and a pin 39 (Fig. 4) extends through the bushing and through a pair of alined holes in the pair of arms 40 which extend down from the lower half of a bracket clamp 41, 42 (Figs. 1, 4 and 6), which bracket is clamped about the spring walking beam 16. The ends of the pin are peened, or suitable other provision is made to keep the pin from slipping out of place. A reinforcing web 45 connects the arms 40 above the location of the bearing 38.

Each of the axles 18 and 19 is formed in the customary manner with an integral annular flange 43 (Figs. 3, 4 and 5) near each end having brake shoe anchors to which an arm 44 from each brake shoe is hingedly connected. The outer flange 36 of the sleeve 33 is bolted to the adjacent integral axle flange 43. Thus the sleeve 33 and with it the sleeve 31 are secured in this way to the axle while the housing 20, 21, for the end of the spring walking beam 16, is clamped between the two sleeves without, however, being rigidly secured to the axle. Due to the resiliency of the rubber bushing 27 the housing 20, 21 and the axle can rotate slightly with respect to each other without the occurrence of any frictional movement of the inner face of the bushing on the axle or the outer surface of the bushing in the housing.

I have described the manner in which one end of one axle is mounted on one end of one of the spring walking beams 16. The mounting for the axles at the other three ends of the walking beams is similar, as will be apparent from Figs. 1 and 2 and thus need not be separately described.

It will be apparent from the description thus far that when the brakes are applied to the wheels, causing the brake shoes on each wheel to be pressed against the brake drum of the wheel, the customary resulting brake torque received by the axle from the brake shoe anchor on the axle flange 43, will be transmitted to the torque arms 37. Furthermore, any tendency of an axle to turn as the result of the brake torque will not, as heretofore, be resisted to any extent by the axle housing. The brake torque, transmitted to the torque arms 37 will result in an upward or a downward force being exerted at the ends of the torque arms, depending upon the direction of rotation of the associated wheels. But since the ends of the torque arms are attached to the brackets 41, 42 which are clamped about the spring walking beams, the brake torque is transferred into forces exerted either upwardly or downwardly on the spring walking beams at the location of the bracket clamps 41, 42. The effect of such forces and the manner in which these forces operate to cause the principal objects of my invention to be attained can be explained more simply and clearly with reference to the diagrammatic Figures 7 and 8 of the drawings.

Referring first to Fig. 7, the dual axle logging trailer diagrammatically represented is assumed to be traveling on a level road towards the right and thus in the direction indicated by the arrow D. All four wheels as viewed in this figure will be rotating in clockwise direction. The weight of the vehicle load L will exert a vertical force downward, which is indicated by the broken line A, and this line will pass through the longitudinal center of the walking beams 16 causing the weight to be distributed equally on both axles 18 and 19. Thus all the wheels can be said to have approximately equal traction. Now, let it be assumed that the brakes are suddenly applied to the wheels in an effort to stop the travel of the vehicle quickly. It will be clear that a resultant force, depending upon the momentum of the load, will be directed obliquely downwardly and forwardly, for example in some such direction as indicated by the broken line B. This would cause the load L to tip downwardly and forwardly if the load were free to do so; but since the load is not free to move in this manner, this force is directed first against the forward sections of the walking beams 16 producing an extra load thrust on the forward axle 19 and on the forward wheels and causing a tendency of the front ends of the walking beams to be lowered and the rear ends of the walking beams to be raised. In fact, if the walking beams were sufficiently rigid and if this force were sufficiently great, the rear wheels could even be lifted momentarily from the ground. Also the application of the brakes to the wheels causes brake torque to be exerted on the axles in the direction of the rotation of the wheels. With the old customary axle mountings, in which the axles are rigidly secured to housings, which in turn are rigidly secured to the ends of the walking beams, the brake torque will exert a force tending to rotate the axle housings in the same direction and this in turn will exert a tendency to twist the front ends of the walking beams down still lower while exerting the opposite tendency on the rear ends of the walking beams. Thus the tendency for greater weight to be imposed on the forward wheels and corresponding less weight to be imposed on the rear wheels will be increased by the braking torque. The result of the combined tendencies and forces is to increase the traction of the front wheels and reduce the traction of the rear wheels. Obviously, under such conditions, if the brake application is equal for all wheels, the rear wheels, due to their reduced traction, may cease rotating entirely and merely skid along the road surface. This is a common occurrence and may frequently be observed in vehicles of standard types in which walking beams form part of the vehicle suspension.

However, in my invention, instead of the rigid mounting of the axles in the housings at the ends of the walking beams, and absorption of the brake torque by the axle housings and the ends of the walking beams, the brake torque is transferred to the torque arms 37 and 37' which in turn transfer this torque into an upward or downward force through the bracket clamps to the walking beams at the points where the bracket clamps are attached. Thus, as indicated in Fig. 7, the brake torque from the front wheels becomes an upwardly directed force acting upon the walking beams between the front ends and the central mounting on the trunnion shaft 11. The momentary effect of this upward force tending to move the forward portions of the walking beams upwardly, which tendency is increased by the reverse tendency of the rear torque arms 37' to lower the rear sections of the walking beams, would be to shift the downward load center weight line A rearwardly to some such position as indicated by the broken line C. But if the load center line of the weight is in the position of the line C instead of the line A, the resultant downward forward force thrust would be along the broken line F instead of along the line B, the line F being parallel to the line B but located to the rear of the line B. This force line F crosses the walking beams nearer the center points 11 and thus there will be less difference between the amounts of resultant load thrust on the forward and rear axles. In other words, there would be less differential in the traction of the front and rear wheels.

A similar condition is set up when the vehicle is traveling down grade and brake torque is encountered. In Fig. 8 the same vehicle is diagrammatically represented as traveling down a grade in the direction of the arrow D. The vertical load center line A no longer crosses the walking beams 16 at their longitudinal center but crosses them further forward, thus indicating that there is a greater load on the front axle and wheels even without any application of the brakes. The resultant downward forward force line when brakes are applied, thus the line B, will in this case be still further forward than as indicated in Fig. 7.

With the application of the brakes the brake torque, with my invention, nevertheless operates in a manner similar to that previously explained with reference to Fig. 7. Thus the forward torque arms 37, as indicated in Fig. 8, will deliver an upward thrust on the forward sections of the walking beams 16 and the rear torque arms 37' will exert a downward pull on the rear sections of these walking beams. This tendency to rotate the walking beams in counter-clockwise direction will have an effect, similar to that already described with reference to Fig. 7, of moving the effective vertical load center line back into some such position as indicated by the line C in Fig. 3. The resultant downward force line B will be moved back into some such position as indicated by the broken line F. This resultant force line F in Fig. 8 crosses the walking beams at some distance forward from the longitudinal center points, thus indicating that there will still be the greater load on the front wheels than on the rear wheels, but since this point of intersection of the force line F with the walking beams is not as far forward as the line B, the differential in the loads carried by the forward and rear wheels will be decidedly less than would be the case if my invention were not employed, and thus the operation of the torque arms increases the traction of the rear wheels in each case.

While my delineation of the theoretical forces involved in the operation of my invention may not be complete, and while the force factors may be more complicated than I have represented them to be, nevertheless the fact remains that with my invention the rear wheels will have greater traction, and extensive tests which I have made in the hauling of log loads under similar conditions, both with and without the employment of my invention, have proved this fact conclusively.

While in the various drawings thus far I have illustrated the walking beams as being located above the axles, my invention is not necessarily to be limited to such arrangement. In Fig. 9 a vehicle with the walking beams extending below the axles is diagrammatically shown. It will be apparent that the torque arms will operate in the same way to exert an upwardly directed force on the forward sections of the walking beams and the opposite tendency on the rear sections of the walking beams. Various modifications could also be made in the construction of the various parts of my vehicle suspension within the scope of my invention. The particular construction which I have illustrated and described is similar to that which I have actually used in practice. However, it is not my intention to limit my invention otherwise than as set forth in the claims:

I claim:

1. In a vehicle suspension, a pair of walking beam assemblies, axles located at the respective ends of said walking beam assemblies, means for attaching said axles to said ends of said walking beam assemblies, brake elements for the vehicle wheels located near the ends of said axles, means for anchoring said brake elements in place, means for permitting slight limited relative rotation of said axle attaching means with respect to said anchoring means, torque transferring members connected with said anchoring means and means connecting said torque transferring members with said walking beam assemblies respectively at spaced distances in from the respective ends of said walking beam assemblies, whereby brake torque imposed by said brake elements on said anchoring means will be received by said torque transferring members and utilized by said transferring members to exert upward or downward thrusts on said walking beam assemblies to accomplish the purpose described.

2. In a vehicle suspension, a pair of walking beam assemblies, axles mounted at the respective ends of said walking beam assemblies, housings for said axles attached to the ends of said walking beam assemblies, brake elements for the vehicle wheels located near the ends of said axles, means for anchoring said brake elements in place, means for permitting slight limited relative rotation of said axle housings with respect to said anchoring means, torque arms connected with said anchoring means, and means connecting said torque arms with said walking beam assemblies respectively at spaced distances in from the respective ends of said walking beam assemblies, whereby brake torque imposed by said brake elements on said anchoring means will be received by said torque arms and utilized by said arms to exert upward or downward thrusts on said walking beam assemblies to accomplish the purpose described.

3. In a vehicle suspension, a pair of walking beam assemblies, axles mounted at the respective ends of said walking beam assemblies, housings for said axles attached to the ends of said walking beam assemblies, means within said housings for permitting slight limited relative rotation of said axles with respect to said housings, brake elements for the vehicle wheels located near the ends of said axles, means secured to each end of said axles for anchoring said brake elements in place, torque transferring members connected with said anchoring means respectively and means connecting said torque transferring members with said walking beam assemblies respectively at spaced distances in from the respective ends of said walking beam assemblies, whereby brake torque imposed by said brake elements on said anchoring means will be received by said torque transferring members and utilized by said transferring members to exert upward or downward thrusts on said walking beam assemblies to accomplish the purpose described.

4. In a vehicle suspension, a pair of walking beams, axles mounted at the respective ends of said walking beams, housings for said axles attached to the ends of said walking beams, brake elements for the vehicle wheels located near the ends of said axles, a flange secured to each end of said axles for anchoring said brake elements in place, means for permitting slight limited relative rotation of said axle housings with respect to said anchoring flanges, torque arms connected with said flanges respectively, and means connecting said torque arms with said walking beams respectively at a spaced distance in from the respective ends of said walking beams, whereby brake torque imposed by said brake elements on said flanges and axles will be received by said torque arms and utilized by said arms to exert upward or downward thrusts on said walking beams to accomplish the purpose described.

5. A vehicle suspension including a pair of walking beam assemblies, axles mounted at the respective ends of said walking beam assemblies, housings for said axles attached to the ends of said walking beam assemblies, means within said housings for permitting slight limited relative rotation of said axles with respect to said housings, brake elements for the vehicle wheels located near the ends of said axles, a flange secured to each end of said axles for anchoring said brake elements in place, torque transferring members connected with said flanges respectively and means connecting said torque transferring members with said walking beam assemblies respectively at spaced distances in from the respective ends of said walking beam assemblies, whereby brake torque imposed by said brake elements on said flanges and axles will be received by said torque transferring members and utilized by said transferring members to exert upward or downward thrusts on said walking beam assemblies to accomplish the purpose described.

6. A vehicle suspension comprising a pair of walking beams, axles mounted at the respective ends of said walking beams, housings for said axles attached to the ends of said walking beams, resilient bushings within said housings for permitting slight limited relative rotation of said axles with respect to said housings, brake elements for the vehicle wheels located near the ends of said axles, a flange secured to each end of said axles for anchoring said brake elements in place, torque arms connected with said flanges respectively, and means connecting said torque arms with said walking beams respectively at a spaced distance in from the respective ends of said walking beams, whereby brake torque imposed by said brake elements on said flanges and axles will be received by said torque arms and utilized by said arms to exert upward or downward thrusts on said walking beams to accomplish the purpose described.

ANCEL S. PAGE.

REFERENCES CITED

The following references are of record in the file of this patent:

UNITED STATES PATENTS

| Number | Name | Date |
|---|---|---|
| 1,933,675 | Marcum | Nov. 7, 1933 |